US010218242B2

United States Patent
Sekii

(10) Patent No.: US 10,218,242 B2
(45) Date of Patent: Feb. 26, 2019

(54) MOTOR

(71) Applicant: Nidec Corporation, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 337 days.

(21) Appl. No.: 15/171,179

(22) Filed: Jun. 2, 2016

(65) Prior Publication Data

US 2016/0372988 A1  Dec. 22, 2016

(30) Foreign Application Priority Data

Jun. 19, 2015  (JP) .................................. 2015-124041

(51) Int. Cl.
| | |
|---|---|
| *H02K 7/02* | (2006.01) |
| *H02K 7/08* | (2006.01) |
| *H04N 9/31* | (2006.01) |
| *G02B 26/00* | (2006.01) |
| *G02B 26/08* | (2006.01) |
| *H02K 5/10* | (2006.01) |
| *H02K 5/02* | (2006.01) |
| *H02K 5/124* | (2006.01) |

(52) U.S. Cl.
CPC ............. *H02K 7/02* (2013.01); *G02B 26/008* (2013.01); *G02B 26/0833* (2013.01); *H02K 5/02* (2013.01); *H02K 5/10* (2013.01); *H02K 5/124* (2013.01); *H02K 7/08* (2013.01); *H04N 9/3114* (2013.01)

(58) Field of Classification Search
CPC  H02K 7/02; H02K 7/08; H02K 5/173; H02K 37/12; H02K 1/18; H02K 11/00; G02B 26/00; G02B 26/08; H04N 9/31
See application file for complete search history.

(56) References Cited

U.S. PATENT DOCUMENTS

| | | | | |
|---|---|---|---|---|
| 4,512,626 A | * | 4/1985 | Kamiya | ................... B41J 2/471 |
| | | | | 359/200.1 |
| 5,438,446 A | * | 8/1995 | Brandt | ..................... G02B 5/09 |
| | | | | 359/196.1 |
| 6,445,096 B1 | * | 9/2002 | Saito | .................... H02K 1/2793 |
| | | | | 310/156.01 |

(Continued)

FOREIGN PATENT DOCUMENTS

JP      2008-223789 A      9/2008

OTHER PUBLICATIONS

Sekii et al.; "Motor"; U.S. Appl. No. 15/168,351, filed May 31, 2016.
Sekii; "Motor"; U.S. Appl. No. 15/168,327, filed Jun. 2, 2016.

*Primary Examiner* — Thomas Truong
*Assistant Examiner* — Leda T Pham
(74) *Attorney, Agent, or Firm* — Keating & Bennett, LLP

(57) ABSTRACT

A motor includes a rotating portion, a stationary portion, and a bearing arranged to support the rotating portion such that the rotating portion is rotatable with respect to the stationary portion. The rotating portion includes a shaft arranged to extend along a central axis, a magnet, a rotor hub arranged to extend in an annular shape around the shaft, and a flywheel fixed to the rotor hub. At least a portion of an outward surface of the rotor hub is a metal surface. The metal surface is arranged radially inward of an outer circumferential surface of the flywheel. A reflectance of the outer circumferential surface of the flywheel is lower than a reflectance of the metal surface.

13 Claims, 8 Drawing Sheets

(56) References Cited

U.S. PATENT DOCUMENTS

| | | | |
|---|---|---|---|
| 6,700,240 B2* | 3/2004 | Akiwa | H02K 1/187 310/156.06 |
| 7,109,620 B2* | 9/2006 | Fujii | F16C 33/103 310/67 R |
| 8,743,445 B2* | 6/2014 | Itami | G02B 5/09 359/219.1 |
| 2006/0208179 A1* | 9/2006 | Itami | G02B 26/121 250/234 |

* cited by examiner

MOTOR

BACKGROUND OF THE INVENTION

1. Field of the Invention

The present invention relates to a motor.

2. Description of the Related Art

In a conventional 1-chip digital light processing (DLP) projector, light from a light source passes through a rotating color wheel. The light in any of frequency bands of R, G, and B is emitted from the color wheel onto a digital micro-mirror device. The reflected light from the digital micro-mirror device is guided onto a predetermined screen, so that an image is displayed on the screen. Such a projector includes a spindle motor for rotating the color wheel.

In the projector, when the light from the light source is reflected off a portion other than the color wheel, diffused reflection occurs in the projector. The diffusely reflected light appears as a noise component on the reflected light from the digital micro-mirror device, which may cause a disadvantage such as distortion of an image to be displayed on the predetermined screen. JP-A 2005-278309 discloses a motor including a rotor hub having a surface defined by a metal member. If such a motor is used in the projector, the light from the light source is reflected off the metal surface of the rotor hub. As a result, the light is diffusely reflected in the projector which fails to correctly display an image.

SUMMARY OF THE INVENTION

A motor according to a first aspect of the present invention includes a rotating portion arranged to rotate about a central axis directed in a vertical direction, a stationary portion, and a bearing. The bearing is arranged to support the rotating portion such that the rotating portion is rotatable with respect to the stationary portion. The rotating portion includes a shaft, a magnet, a rotor hub, and a flywheel. The shaft is arranged to extend along the central axis. The rotor hub is arranged to extend in an annular shape around the shaft. The flywheel is fixed to the rotor hub. At least a portion of an outward surface of the rotor hub is a metal surface. The metal surface is arranged radially inward of an outer circumferential surface of the flywheel. The outer circumferential surface of the flywheel has a reflectance lower than a reflectance of the metal surface.

A motor according to a second aspect of the present invention includes a rotating portion arranged to rotate about a central axis directed in a vertical direction, a stationary portion, and a bearing. The bearing is arranged to support the rotating portion such that the rotating portion is rotatable with respect to the stationary portion. The rotating portion includes a shaft, a magnet arranged to extend in an annular shape, a rotor hub, and a flywheel. The shaft is arranged to extend along the central axis. The rotor hub is arranged to extend in an annular shape around the shaft. The flywheel is fixed to the rotor hub and is arranged to cover an entire outer circumferential surface of the rotor hub.

A motor according to a third aspect of the present invention includes a rotating portion arranged to rotate about a central axis directed in a vertical direction, a stationary portion, and a bearing. The bearing is arranged to support the rotating portion such that the rotating portion is rotatable with respect to the stationary portion. The rotating portion includes a shaft, a magnet arranged to extend in an annular shape, a rotor hub, and a flywheel. The shaft is arranged to extend along the central axis. The rotor hub is arranged to extend in an annular shape around the shaft. The flywheel is fixed to the rotor hub. At least a portion of a radially outward surface of the rotor hub is a metal surface having a reflectance higher than a reflectance of the flywheel. The stationary portion includes a cylindrical portion arranged radially outward of the metal surface. The cylindrical portion is arranged to cover at least a portion of the metal surface. A surface of the cylindrical portion has a reflectance lower than a reflectance of the metal surface.

According to the first aspect of the present invention, it is possible to reduce occurrence of diffused reflection of light from a light source.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, motors according to preferred embodiments will be described. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a flywheel is arranged with respect to a rotor hub is an upper side, and the shape of each member or portion and relative positions of different members or portions will be described based on the above assumptions. It should be noted, however, that the above definitions of the vertical direction and the upper and lower sides are not meant to restrict in any way the orientation of a motor according to any preferred embodiment of the present invention at the time of manufacture or when in use.

Figure 1:
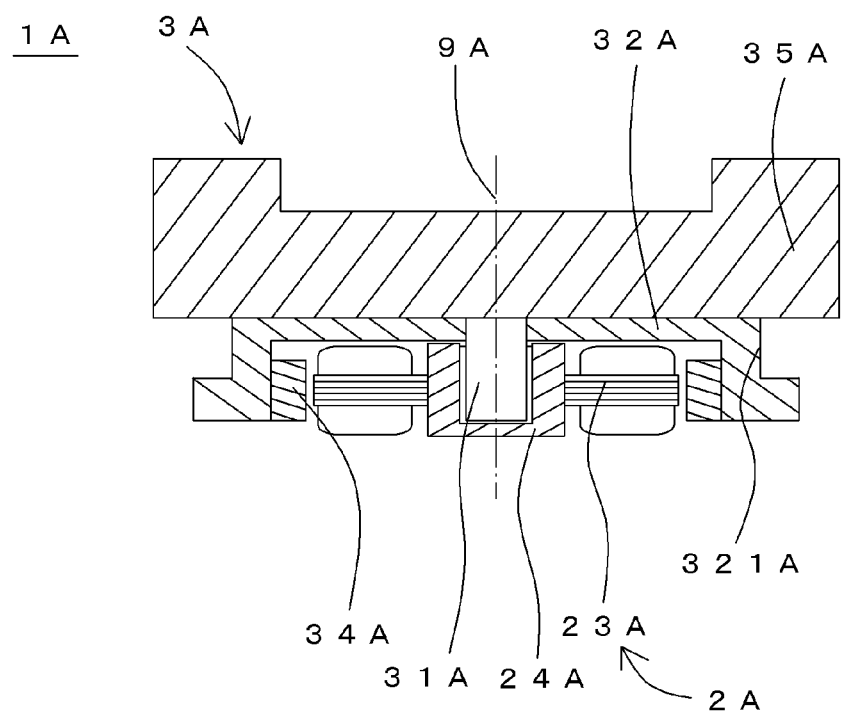
FIG. 1 is a vertical cross-sectional view of a motor according to a first preferred embodiment of the present invention.

FIG. 1 is a vertical cross-sectional view of a motor 1A according to a first preferred embodiment of the present invention. Referring to FIG. 1, the motor 1A includes a stationary portion 2A having a stator 23A, and a rotating portion 3A. The rotating portion 3A is supported to be rotatable about a central axis 9A with respect to the stationary portion 2A.

The rotating portion 3A includes a shaft 31A, a rotor hub 32A, a magnet 34A, and a flywheel 35A. The shaft 31A is arranged to extend along the central axis 9A. The rotor hub 32A is arranged to extend in an annular shape around the shaft 31A. The magnet 34A is a substantially cylindrical member having a magnetic pole surface arranged radially opposite to the stator 23A. The flywheel 35A is fixed to an upper surface or a side surface of the rotor hub 32A.

The stationary portion 2A includes a sleeve 24A arranged to rotatably support the shaft 31A. At least a portion of a surface of the rotor hub 32A has a metal surface 321A arranged radially inward of an outer circumferential surface of the flywheel 35A.

Referring to FIG. 1, the outer circumferential surface of the flywheel 35A has a reflectance lower than a reflectance of the metal surface 321A. This reduces occurrence of diffused reflection of light in a housing, the light being emitted from a light source and then reflected off the metal surface 321A of the rotor hub 32A.

Figure 2:
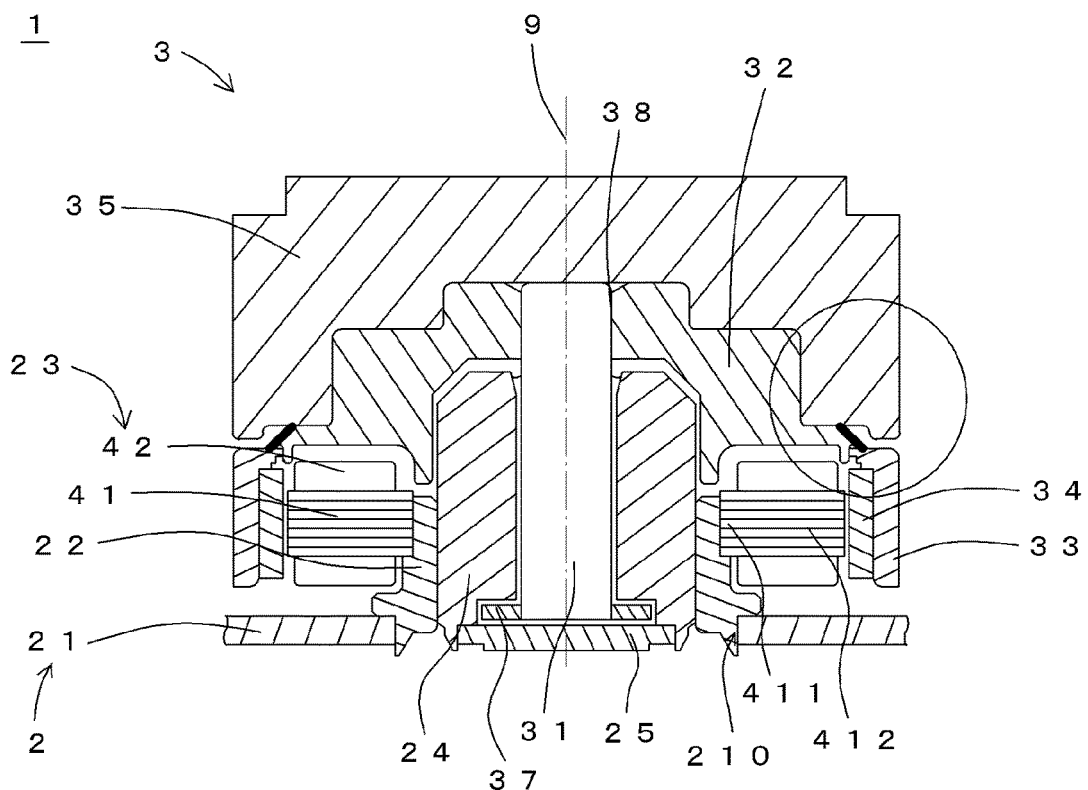
FIG. 2 is a vertical cross-sectional view of a motor according to a second preferred embodiment of the present invention.

FIG. 2 is a vertical cross-sectional view of a motor 1 according to a second preferred embodiment of the present invention. Referring to FIG. 2, the motor 1 includes a stationary portion 2 and a rotating portion 3. The rotating portion 3 is supported to be rotatable about a central axis 9 extending in a vertical direction with respect to the stationary portion 2.

The stationary portion 2 preferably includes a mounting plate 21, a stator holder 22, a stator 23, and a sleeve 24.

The mounting plate 21 is a plate-shaped member arranged to support the stator holder 22. A metal, such as, for example, stainless steel, is used as a material of the mounting plate 21. The mounting plate 21 is arranged to be substantially perpendicular to the central axis 9. The mounting plate 21 includes a through hole 210 including an opening edge which is circular in a plan view. A lower end portion of the stator holder 22 is fitted in the through hole 210. When the motor 1 is fitted to a device or the like, the mounting plate 21 is fixed to a frame of the device or the like through, for example, screws. Note that a circuit board to supply electric drive currents to coils 42 of the stator 23, which will be described below, may be arranged on a surface of the mounting plate 21.

The stator holder 22 is a substantially cylindrical member extending in the axial direction. The lower end portion of the stator holder 22 is inserted into the through hole 210, and is fixed to the mounting plate 21 preferably by crimping. Note, however, that the stator holder 22 may alternatively be fixed to the mounting plate 21 by another method, such as, for example, welding. Also note that the mounting plate 21 and the stator holder 22 may alternatively be defined by a single continuous monolithic member.

The stator 23 includes a stator core 41 and the coils 42. The stator core 41 is defined by, for example, laminated steel sheets, each of which is a magnetic body. The stator core 41 includes an annular core back 411 and a plurality of teeth 412. The stator holder 22 is inserted into a through hole of the core back 411. The core back 411 is fixed to an outer circumferential surface of the stator holder 22. The core back 411 is fixed to the stator holder 22 through, for example, press fitting, adhesion, or the like. The teeth 412 are arranged to project radially outward from the core back 411. A surface of the stator core 41, including the teeth 412, is coated with an insulating coating. A conducting wire is wound around each of the teeth 412 to define the coils 42. Note that, in place of the insulating coating, an insulator made of a resin may be arranged between the teeth 412 and the coils 42. Also note that the stator core 41 may alternatively be defined by a dust core.

The sleeve 24 is a member arranged to rotatably support a shaft 31, which will be described below. The sleeve 24 is a substantially cylindrical member, and is arranged to extend in the axial direction around the shaft 31. A lower portion of the sleeve 24 is inserted into a space radially inside the stator holder 22, (i.e., into a through hole of the stator holder 22), and is fixed to the stator holder 22 through, for example, an adhesive. An upper end portion of the sleeve 24 is arranged axially above both an upper end portion of the stator holder 22 and an upper end portion of the stator 23. An opening at a lower end portion of the sleeve 24 is closed by a disk-shaped cap 25.

The rotating portion 3 preferably includes the shaft 31, a rotor hub 32, a yoke 33, a magnet 34, and a flywheel 35.

The shaft 31 is a columnar member arranged to extend along the central axis 9. A metal, such as, for example, stainless steel, is used as a material of the shaft 31. A lower end portion of the shaft 31 is arranged radially inside of the sleeve 24 (i.e., in a through hole of the sleeve 24). An upper end portion 311 of the shaft 31 is arranged axially above the upper end portion of the sleeve 24. An outer circumferential surface of the shaft 31 is arranged radially opposite to an inner circumferential surface of the sleeve 24 with a slight gap therebetween.

A ring-shaped thrust plate 37 is fixed to the lower end portion of the shaft 31. The thrust plate 37 is arranged to extend radially outward from a lower end of the shaft 31. An upper surface of the thrust plate 37 is arranged axially opposite to a lower surface of the sleeve 24 with a slight gap therebetween. A lower surface of the thrust plate 37 is arranged axially opposite to an upper surface of the cap 25 with a slight gap therebetween.

The rotor hub 32 is arranged to extend in an annular shape around the shaft 31. A metal, such as, for example, an aluminum alloy, is used as a material of the rotor hub 32. An inner circumferential surface of the rotor hub 32 is fixed to an outer circumferential surface of the shaft 31. In the motor 1, the shaft 31 and the rotor hub 32 are fixed to each other through press fitting and an adhesive 38. Note, however, that the shaft 31 and the rotor hub 32 may alternatively be fixed to each other through only press fitting or through only the adhesive 38. Also note that the shaft 31 and the rotor hub 32 may alternatively be fixed to each other by another method, such as, for example, shrink fitting.

The rotor hub 32 includes a cylindrical portion 322 and a flange portion 323. The cylindrical portion 322 of the rotor hub 32 is arranged radially outward of a junction of the shaft 31 and the rotor hub 32, and is arranged to extend in a cylindrical shape in the axial direction. The flange portion 323 is arranged to extend radially outward from a lower end portion of the cylindrical portion 322.

The yoke 33 is a cylindrical member arranged to hold the magnet 34. An outer circumferential surface of the magnet 34 is fixed to an inner circumferential surface of the yoke 33. The yoke 33 is arranged to be coaxial with the central axis 9. A magnetic material, such as, for example, iron, is used as a material of the yoke 33. An upper end portion of the yoke 33 is fixed to a lower surface of the flange portion 323 of the rotor hub 32 through, for example, an adhesive, crimping, or the like.

The magnet 34 is fixed to the inner circumferential surface of the yoke 33 through, for example, an adhesive or the like. In the motor 1, an annular permanent magnet is used as the magnet 34. The magnet 34 is a substantially cylindrical member arranged radially outward the stator 23. An inner circumferential surface of the magnet 34 includes north and south poles arranged to alternate with each other in a circumferential direction. Moreover, the inner circumferential surface of the magnet 34 is arranged radially opposite to radially outer end surfaces of teeth 412 with a slight gap therebetween. That is, the magnet 34 has a magnetic pole surface arranged opposite to the stator 23 in the radial direction. Note, however, that the magnet 34 may not necessarily be annular, and that a plurality of magnets may alternatively be used in place of the magnet 34. In the case where a plurality of magnets are used, a plurality of magnets 34 are arranged on the inner circumferential surface of the yoke 33 such that north and south poles alternate with each other in the circumferential direction.

Once the electric drive currents are supplied to the coils 42, a rotating magnetic field is generated in the teeth 412. Interaction between magnetic flux of the teeth 412 and magnetic flux of the magnet 34 produces a circumferential torque. This allows the rotating portion 3, including the magnet 34, to rotate about the central axis 9.

The flywheel 35 is arranged on at least one of an upper surface and a side surface of the rotor hub 32. The flywheel 35 is fixed to the rotor hub 32 through, for example, an adhesive. Accordingly, the flywheel 35 rotates together with the rotor hub while the motor 1 is running. An ABS resin, which is a thermoplastic resin, for example, is used as a material of the flywheel 35. Note that, instead of the ABS resin, another material, such as, for example, a thermosetting resin or a metal, may alternatively be used as the material of the flywheel 35. The flywheel 35 is able to achieve a lower weight when the flywheel 35 is made of a resin than when the flywheel 35 is made of a metal. Use of a resin for the flywheel 35 therefore leads to reducing a load during rotation of the motor 1.

In the motor 1, the flywheel 35 is arranged to have a circular external shape when viewed in the axial direction with the central axis 9 as a center. This circular external shape of the flywheel 35 contributes to reducing swinging of the rotating portion 3 while the motor 1 is running.

Next, a fluid dynamic bearing 5 included in the motor 1 will now be described below. A lubricating oil 50 is arranged between a combination of the sleeve 24 and the cap 25 and a combination of the shaft 31 and the thrust plate 37. A liquid surface of the lubricating oil 50 is defined between the shaft 31 and the sleeve 24. A polyester oil or a diester oil, for example, is used as the lubricating oil 50. The shaft 31 is supported to be rotatable with respect to the sleeve 24 and the cap 25 with the lubricating oil 50 arranged therebetween.

In the second preferred embodiment, the fluid dynamic bearing 5 is defined by the sleeve 24 and the cap 25 each of which is the member of the stationary portion 2, the shaft 31, the rotor hub 32, and the thrust plate 37 each of which is the member of the rotating portion 3, and the lubricating oil 50 arranged between the members. The rotating portion 3 is supported by the fluid dynamic bearing 5 so as to be rotatable about the central axis 9. Note that the rotating portion 3 may be supported by a bearing such as a ball bearing or a sliding bearing, for example, so as to be rotatable with respect to the stationary portion 2.

Figure 3:
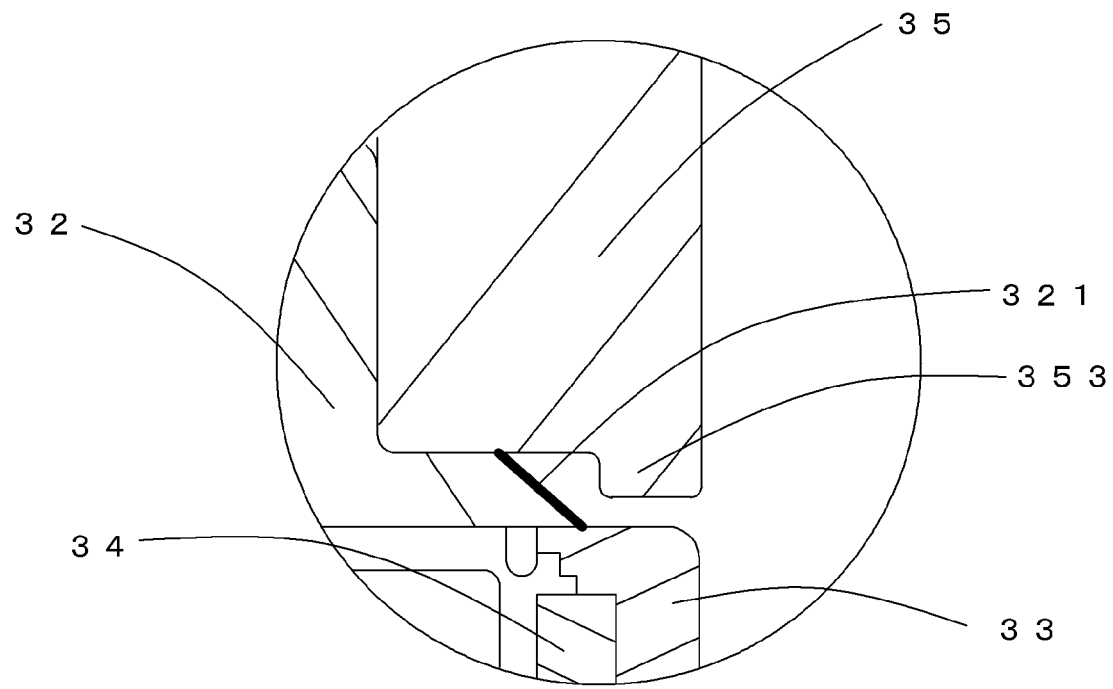
FIG. 3 is a partial cross-sectional view of the motor according to the second preferred embodiment of the present invention.

FIG. 3 is a partial cross-sectional view of the motor 1 according to the second preferred embodiment of the present invention. At least a portion of a radially outward surface of the rotor hub 32 has a metal surface 321 arranged radially inward of an outer circumferential surface of the flywheel 35. The metal surface 321 is preferably a cutting process surface which is not subjected to surface treatment. The radially outward surface of the rotor hub 32 is arranged radially outward the rotor hub 32 and includes a lower surface, an upper surface, an inclined surface, and an outer circumferential surface. Note that the surface, arranged opposite to the shaft 31, of the rotor hub 32 and the surface, arranged opposite to the sleeve, of the rotor hub 32 are not included in the radially outward surface of the rotor hub 32.

The outer circumferential surface of the flywheel 35 has a reflectance lower than a reflectance of the metal surface 321. In the second preferred embodiment, a resin is used as the material of the flywheel 35 and the metal surface 321 is made of aluminum. Therefore, the reflectance of the outer circumferential surface of the flywheel 35 becomes lower than the reflectance of the metal surface 321. In addition, at least a portion of the surface of the rotor hub 32 has the metal surface 321 arranged radially inward of the outer circumferential surface of the flywheel 35. In the second preferred embodiment, the metal surface 321 is arranged on a side surface of the rotor hub 32. Note, however, that the metal surface 321 may alternatively be arranged on the upper surface or the side surface of the rotor hub 32. Note that the metal surface 321 may be arranged radially inward of the flywheel 35 and the surface, other than the metal surface 321, of the rotor hub 32 may be arranged on the same radial position as the flywheel 35 or may be arranged outward of the flywheel 35.

A color disk (not illustrated), on which light from a light source is incident, is fixed to an upper portion of the flywheel. The color disk (not illustrated) is rotatable at high speed by the rotation of the motor 1. The color disk (not illustrated) has colors of R, G, and B, for example. The light from the light source passes through the color disk (not illustrated) and then is emitted onto a predetermined screen via a micro-mirror device.

In a housing in which the motor 1 is mounted, the light from the light source arranged below the motor 1 passes by the motor 1 and then is incident on the color disk (not illustrated) at an angle parallel to the central axis 9. However, if the outer circumferential surface, which is made of a metal with high reflectance, of the rotor hub 32 is exposed, a portion of the light emitted from the light source is reflected off the outer circumferential surface of the rotor hub 32. The light reflected off the rotor hub 32 passes through the color disk (not illustrated) at an angle with respect to the central axis 9 or/and is diffusely reflected in the housing. Accordingly, the light passing through the color disk (not illustrated) at an angle substantially parallel to the central axis 9 and the light passing through the color disk (not illustrated) at an angle with respect to the central axis 9 are present mixedly. As a result, there is a possibility in that an image to be displayed on a predetermined screen is distorted.

According to the present invention, the reflectance of the outer circumferential surface of the flywheel 35 is lower than the reflectance of the metal surface 321, and at least a portion of the surface of the rotor hub 32 has the metal surface 321 arranged radially inward of the outer circumferential surface of the flywheel 35. With this configuration, there is a low possibility in that the light from the light source is incident on the radially inward metal surface 321 of the rotor hub 32. In addition, even if the light is incident on the metal surface 321 of the rotor hub 32, the incident light is reflected off the flywheel 35 arranged radially outward of the metal surface 321. This reduces the occurrence of diffused reflection in the housing.

Moreover, even if the reflected light in the housing is incident from above in the axial direction, the metal surface 321 is shielded with the flywheel 35. This prevents the incident light from reaching the metal surface 321. Accordingly, this reduces the occurrence of diffused reflection of the light in the housing, the light being emitted from the light source and then reflected off the metal surface 321 of the rotor hub 32.

In the case where the flywheel 35 is made of a metal, the outer circumferential surface of the flywheel 35 is made of a material having a reflectance lower than the reflectance of the metal surface 321. For example, the outer circumferential surface of the flywheel 35 is desirably formed from a black coloring material obtained by performing plating and then oxidation processing on a surface of a metal such as stainless steel. Note that the yoke 33 is not necessarily black, but may be gray, green, or the like, for example. In the second preferred embodiment, the black oxide plating is electroplating. The treatment using electroplating brings about a plated layer of large thickness and reduces the reflection of incident light. Note that electroless nickel plating may be employed in place of the electroplating.

The flywheel 35 is subjected to plating and then oxidation processing, so that reflectance of the outer circumferential surface of the flywheel 35 becomes lower than the reflectance of the metal surface 321. Accordingly, the incident light from the radially outer side of the flywheel 35 is reflected off the outer circumferential surface of the flywheel 35 prior to the metal surface 321. This reduces the reflection of the incident light off the metal surface 321. Accordingly, this reduces the occurrence of diffused reflection of the light in the housing, the light being emitted from the light source and then reflected off the metal surface 321 of the rotor hub 32.

In order to reduce the diffused reflection of the incident light off the metal surface 321, desirably, the outer circumferential surface of the flywheel 35 is subjected to surface roughing. Examples of the surface roughing may include a method of forming a trace of cutting or pressing on the outer circumferential surface, a shot blasting method of spraying an abrasive such as sand onto the outer circumferential surface, a method of applying and curing a resin in which fine particles are dispersed, a method of applying a chemical solvent to the outer circumferential surface to melt the surface, and a method of spraying a chemical solvent onto the outer circumferential surface. The flywheel 35 may be subjected to surface roughing after the plating and oxidation processing.

The outer circumferential surface of the flywheel 35 may be applied with a coating having a reflectance lower than the reflectance of the metal surface. The outer circumferential surface of the flywheel 35 may be applied with a tape made of a material with low reflectance.

Referring to FIG. 2, the metal surface 321 is arranged radially inward of an outer circumferential surface of the yoke 33. In addition, a reflectance of the outer circumferential surface of the yoke 33 is lower than the reflectance of the metal surface 321. Since the reflectance of the outer circumferential surface of the yoke 33 is lower than the reflectance of the outer circumferential surface of the rotor hub 32, the light incident on the motor 1 is absorbed by the outer circumferential surface of the yoke 33 with low reflectance. This reduces the diffused reflection of the light in the housing. The yoke 33 may be formed from a black coloring material obtained by plating and then oxidation processing. Note that the yoke 33 is not necessarily black, but may be gray, green, or the like, for example. The yoke 33 is subjected to plating and then oxidation processing, so that the reflectance of the outer circumferential surface of the flywheel 35 becomes lower than the reflectance of the metal surface 321. In addition, the metal surface 321 is arranged radially inward of the outer circumferential surface of the yoke 33. Therefore, the incident light from the outer circumferential side of the rotor hub 32 is reflected off the outer circumferential surface of the flywheel 35 prior to the metal surface 321. This reduces the reflection of the incident light off the metal surface 321.

The outer circumferential surface of the yoke 33 may be subjected to surface roughing in place of the plating and then oxidation processing. Examples of the surface roughing may include a method of forming a trace of cutting or pressing on the outer circumferential surface, a shot blasting method of spraying an abrasive such as sand onto the outer circumferential surface, a method of applying and curing a resin in which fine particles are dispersed, a method of applying a chemical solvent to the outer circumferential surface to melt the surface, and a method of spraying a chemical solvent. In addition, a cylindrical metal or resin member having an outer circumferential surface which is lower in reflectance than the metal surface 321 may be fixed to the outer circumferential surface of the yoke 33.

The outer circumferential surface of the yoke 33 may be applied with a coating having a reflectance lower than the reflectance of the metal surface. The outer circumferential surface of the flywheel 35 may be applied with a tape made of a material with low reflectance.

FIG. 3 is an enlarged view of the main constituents in FIG. 2. Referring to FIG. 3, the flywheel 35 includes a wall portion 353 arranged to cover at least a portion of the metal surface 321. The wall portion 353 has a cylindrical shape extending downward from a radially outer end thereof. The wall portion 353 is arranged radially outward of the metal surface 321 so as to partially overlap with the metal surface 321 in the radial direction. The wall portion 353 shields the incident light from the radially outer side of the flywheel 35. This reduces the reflection of the incident light off the metal surface 321 and also reduces the occurrence of diffused reflection in the housing.

The metal surface 321 is an inclined surface at an angle with respect to the central axis 9. If the rotor hub 32 has no inclined surface, the incident light in the direction substantially perpendicular to the central axis 9 is reflected off the outer circumferential surface, which is parallel to the central axis 9, of the rotor hub 32, and then is emitted in the incident direction. Accordingly, there is a possibility in that the light reflected off the rotor hub 32 is diffusely reflected in the housing.

According to the present invention, the metal surface 321 is inclined with respect to the central axis 9. Therefore, the incident light in the direction substantially perpendicular to the central axis 9 is reflected off the metal surface 321, is reflected off the flywheel 35 or the yoke 33, and then is emitted into the housing. Accordingly, even when the light is incident from the direction substantially perpendicular to the central axis 9, the incident light is emitted into the housing after being reflected off the flywheel 35 or the yoke 33, which has the reflectance lower than the reflectance of the metal surface 321. This lowers the intensity of the light and also reduces diffused reflection of the light in the housing.

Note that the metal surface 321 may have an angle with respect to the central axis 9. In the second preferred embodiment, the metal surface 321 is inclined radially inward in the axially upward direction. Since the metal surface 321 is inclined radially inward in the axially upward direction, the incident light from the direction substantially perpendicular to the central axis 9 is reflected off the metal surface 321 and then is reflected off the flywheel 35 having the reflectance lower than the reflectance of the metal surface 321. Thus, the intensity of the light is lowered. Thereafter, the light is emitted into the housing. This reduces the diffused reflection of the light in the housing. If the metal surface 321 is inclined radially outward in the axially upward direction, the incident light is reflected off the metal surface 321 and then is reflected off the yoke 33 having the reflectance lower than the reflectance of the metal surface 321. Thus, the intensity of the light is lowered. Thereafter, the light is emitted into the housing. This reduces the diffused reflection of the light in the housing.

Third Preferred Embodiment

Figure 4:
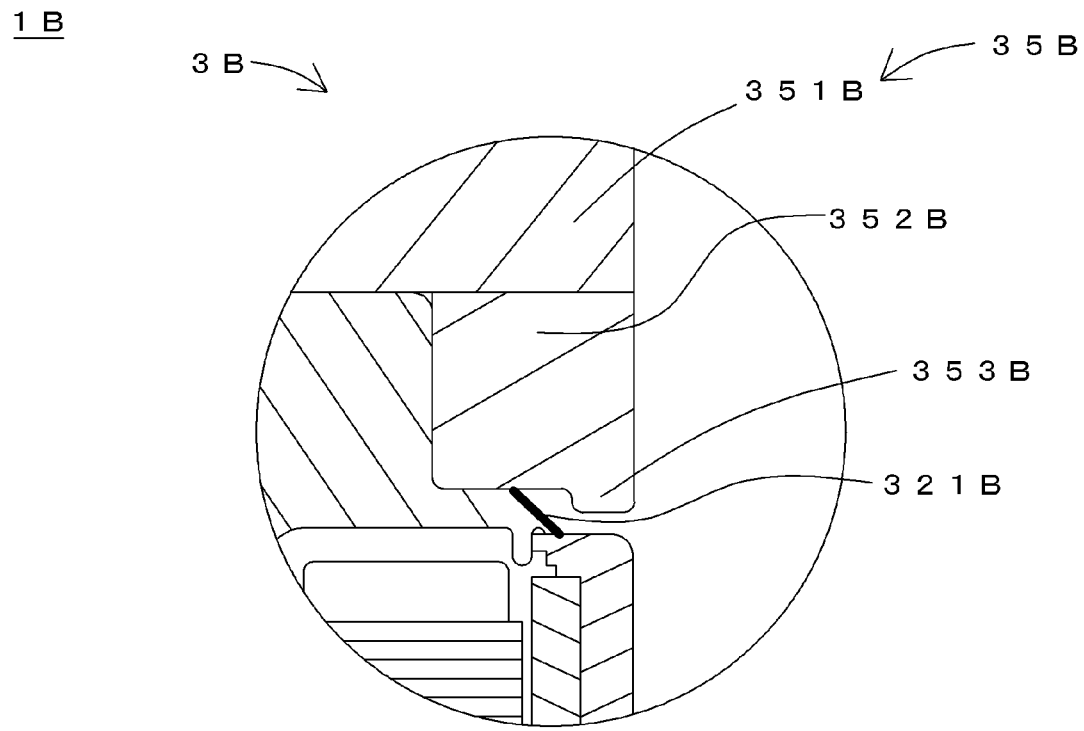
FIG. 4 is a partial cross-sectional view of a motor according to a third preferred embodiment of the present invention.

FIG. 4 is a partial cross-sectional view of a motor according to a third preferred embodiment of the present invention. A flywheel 35B includes a flywheel main body 351B and an inertia portion 352B. The inertia portion 352B is made of a metal and is arranged to extend downward from a lower end of the flywheel main body 351B. In the third preferred embodiment, a resin is used as a material of the flywheel main body 351B and a metal, such as, for example, stainless steel, is used as a material of the inertia portion 352B. The inertia portion 352B increases an inertial force of a rotating portion 3B when a motor 1B is running. This leads to a stable posture of the rotating portion 3B. In particular, in the motor 1B, the inertia portion 352B is arranged to have a total mass greater than a total mass of the flywheel main body 351B. This leads to a more stable posture of the rotating portion 3B. Note that the inertia portion 352B may not necessarily be arranged to have a total mass greater than the total mass of the flywheel main body 351B. That is, the inertia portion 352B may alternatively be arranged to have a total mass smaller than the total mass of the flywheel main body 351B.

A reflectance of an outer circumferential surface of the inertia portion 352B is lower than a reflectance of a metal surface 321B. More specifically, a reflectance of an outer circumferential surface of the flywheel main body 351B and the reflectance of the outer circumferential surface of the inertia portion 352B are lower than the reflectance of the metal surface 321B. Therefore, light from a light source is reflected off the metal surface 321B of a rotor hub 32B, and the reflected light is hit on the inertia portion 352B arranged radially outward of the metal surface 321B. Therefore, the light is absorbed and the intensity of the light is lowered. Thereafter, the light is emitted into the housing. This reduces the diffused reflection of the light in the housing.

The flywheel 35B may be a resin-molded article produced with the inertia portion 352B as an insert. That is, a molten resin is poured into a cavity of a mold with the inertia portion 352B arranged in the mold, and the resin is cured to mold the flywheel 35B. This achieves the molding of the flywheel 35B and the fixing of the flywheel 35B to the inertia portion 352B at the same time. Thus, a reduction in the number of processes to manufacture the motor 1B is achieved. Moreover, the flywheel main body 351B and the inertia portion 352B are fixed to each other with increased strength. However, the flywheel main body 351B and the inertia portion 352B may be fixed to each other through an adhesive, for example. The outer circumferential surface of the inertia portion 352B may be subjected to black oxide plating. The outer circumferential surface of the inertia portion 352B may alternatively be subjected to surface roughing.

In the third preferred embodiment, the inertia portion 352B includes a cylindrical wall portion 353B arranged to extend axially downward from an outer end thereof. The wall portion 353B is arranged to cover at least a portion of the metal surface 321B. Accordingly, the incident light from above the motor 1B is shielded. The region covering the metal surface 321B reduces the reflection of the light incident from a direction substantially parallel to a central axis 9B. Even when the incident light from below the motor 1B is hit on the metal surface 321B, the light is thereafter reflected off the inertia portion 352B having the reflectance lower than the reflectance of the metal surface 321B, so that the intensity of the light is lowered. This reduces an influence of diffused reflection on the housing.

Fourth Preferred Embodiment

Figure 5:
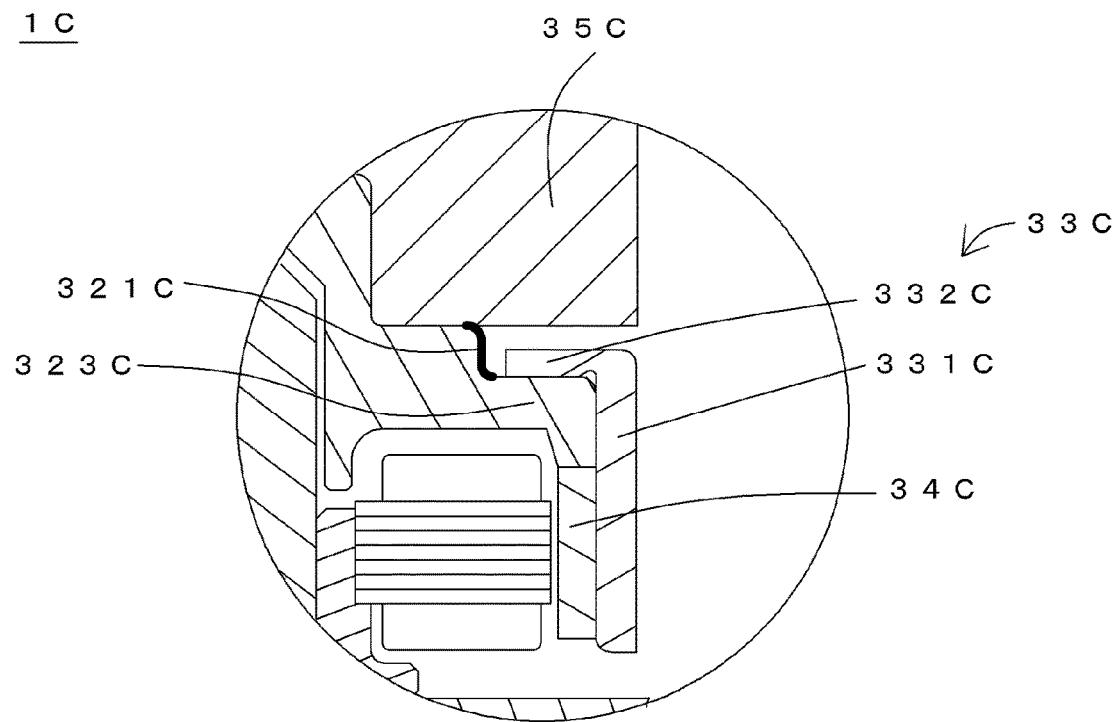
FIG. 5 is a partial cross-sectional view of a motor according to a fourth preferred embodiment of the present invention.

FIG. 5 is a partial cross-sectional view of a motor 1C according to a fourth preferred embodiment of the present invention. A yoke 33C has a yoke cylindrical portion 331C and a yoke upper plate portion 332C. A magnet 34C is fixed to an inner circumferential surface of the yoke cylindrical portion 331C. The yoke cylindrical portion 331C may be arranged to extend downward of a lower end of the magnet 34C.

A metal surface 321C is arranged radially inward of an outer circumferential surface of the yoke cylindrical portion 331C. In addition, a reflectance of the outer circumferential surface of the yoke cylindrical portion 331C is lower than a reflectance of the metal surface 321C. Since the reflectance of the outer circumferential surface of the yoke cylindrical portion 331C is lower than the reflectance of the outer circumferential surface of the metal surface 321C, light incident from the outer circumferential side of the yoke 33C is absorbed by the outer circumferential surface of the yoke cylindrical portion 331C with low reflectance. This reduces the reflection of the incident light off the metal surface 321C. The yoke 33C may be formed from a black coloring material subjected to plating and oxidation processing. The yoke 33C is subjected to black oxide plating, so that the reflectance of the outer circumferential surface of the yoke cylindrical portion 331C becomes lower than the reflectance of the metal surface 321C. In addition, the metal surface 321C is arranged radially inward of the outer circumferential surface of the yoke cylindrical portion 331C. Therefore, light incident from an outer circumferential side of a rotor hub 32C is hit on the outer circumferential surface of the yoke 33C prior to the metal surface 321C. This reduces the reflection of the incident light off the metal surface 321C.

The yoke upper plate portion 332C is a ring-shaped member arranged to extend radially inward from an upper end of the yoke cylindrical portion 331C. A lower surface of the yoke upper plate portion 332C is arranged to be in contact with an upper surface of a flange portion 323C of the rotor hub 32C. At the time of manufacture of the motor 1C, for example, the flange portion 323C of the rotor hub 32C is press fitted from below into a radially inner side of the yoke cylindrical portion 331C. Thereafter, the magnet 34C is inserted into the radially inner side of the yoke cylindrical portion 331C, and the inner circumferential surface of the yoke cylindrical portion 331C and the outer circumferential surface of the magnet 34C are fixed to each other through an adhesive.

The yoke 33C is arranged to cover at least a portion of the metal surface 321C and the entire outer circumferential surface of the magnet 34C. More specifically, the yoke upper plate portion 332C radially overlaps with the metal surface 321C of the rotor hub 32C.

The yoke upper plate portion 332C of the yoke 33C is arranged to cover at least a portion of the metal surface 321C, so that the yoke 33C shields the incident light from the radially outer side of the flywheel 35C. This reduces the reflection of the incident light off the metal surface 321C and also reduces the occurrence of diffused reflection in a housing.

The outer circumferential surface of the yoke 33C may be subjected to surface roughing in place of the black oxide plating. Examples of the surface roughing may include a method of forming a trace of cutting or pressing on the outer circumferential surface, a shot blasting method of spraying an abrasive such as sand onto the outer circumferential surface, a method of applying and curing a resin in which fine particles are dispersed, a method of applying a chemical solvent to the outer circumferential surface to melt the surface, and a method of spraying a chemical solvent. In addition, a cylindrical metal or resin member having an outer circumferential surface which is lower in reflectance than the metal surface 321C may be fixed to the outer circumferential surface of the yoke 33C.

The yoke upper plate portion 332C and the flywheel 35C may be in contact with or in non contact with each other. In the fourth preferred embodiment, the yoke upper plate portion 332C and the flywheel 35C are in non contact with each other. That is, an axial cavity is present between the upper surface of the yoke upper plate portion 332C and the lower surface of the flywheel 35C. This prevents deformation of the yoke 33C due to the flywheel 35C. Accordingly, this prevents the magnet 34C from tilting due to the deformation of the yoke 33C, which reduces an influence on a magnetic circuit.

Fifth Preferred Embodiment

Figure 6:
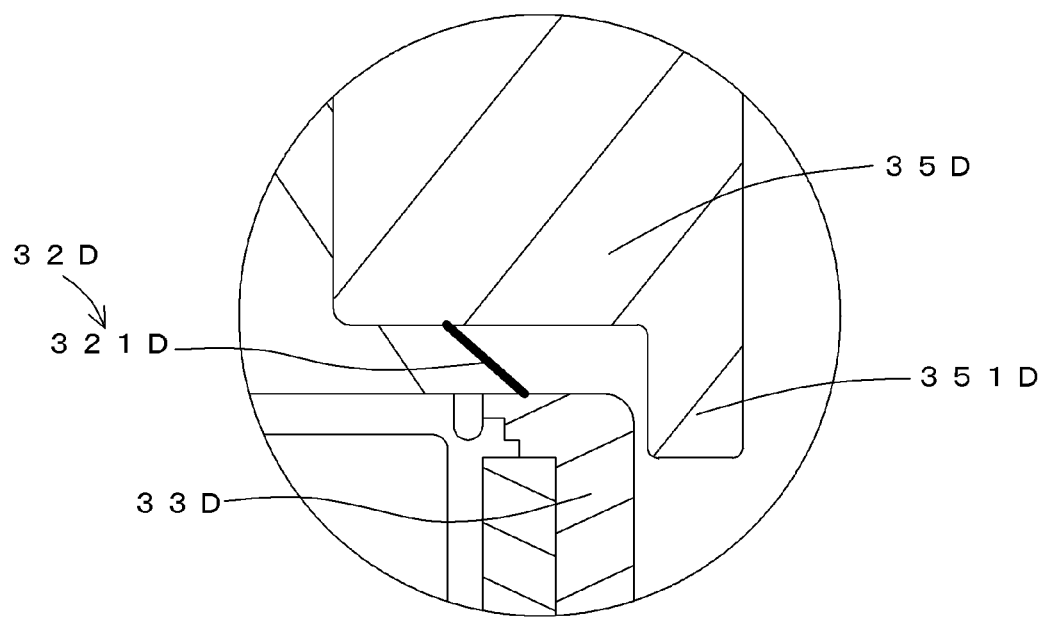
FIG. 6 is a partial cross-sectional view of a motor according to a fifth preferred embodiment of the present invention.

FIG. 6 is a partial vertical cross-sectional view of a motor 1D according to a fifth preferred embodiment of the present invention. A flywheel 35D in FIG. 6 includes a cylindrical wall portion 351D arranged to extend axially downward from an outer circumferential portion thereof. The flywheel 35D is arranged to cover an entire outer circumferential surface of a rotor hub 32D. In other words, the wall portion 351D is arranged to cover at least from upper to lower ends of a metal surface 321D of the rotor hub 32D. Note that the wall portion 351D may be arranged to cover the upper to lower ends of the outer circumferential surface of the rotor hub 32D and at least a portion of an outer circumferential surface of a yoke 33D. The entire metal surface 321D of the rotor hub 32D can thus be covered. This prevents light incident from the outer circumferential side of the rotor hub 32D from being reflected off the metal surface 321D. Moreover, the wall portion 351D is arranged to cover the upper to lower ends of the outer circumferential surface of the rotor hub 32D and at least a portion of the outer circumferential surface of the yoke 33D. This reduces the reflection of, off the yoke 33D, the light incident from the outer circumferential side of the rotor hub 32D.

A reflectance of the outer circumferential surface of the wall portion 351D is lower than a reflectance of the yoke 33D. Since the reflectance of the outer circumferential surface of the wall portion 351D is lower than the reflectance of the outer circumferential surface of the yoke 33D, light from a light source is absorbed by the outer circumferential surface of the wall portion 351D with low reflectance. This reduces the diffused reflection in a housing.

Figure 7:
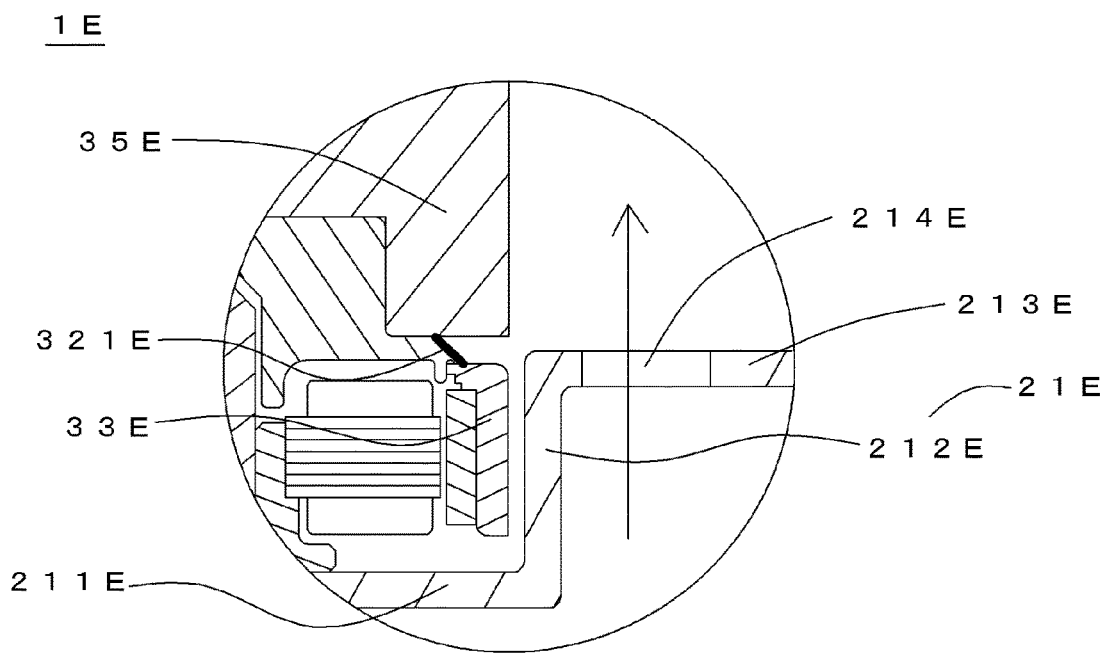
FIG. 7 is a partial vertical cross-sectional view of a motor according to an example modification of the present invention.

FIG. 7 is a partial vertical cross-sectional view of a motor 1E according to an example modification of the present invention. A mounting plate 21E includes a lower flat plate portion 211E arranged axially below a stator 23E so as to extend in an annular shape, a cylindrical portion 212E arranged to extend upward from an outer end of the lower flat plate portion 211E, and an upper flat plate portion 213E arranged to extend radially upward from an upper end of the cylindrical portion 212E. The cylindrical portion 212E is arranged radially outward of a metal surface 321E so as to cover an entire outer circumferential surface of a yoke 33E and at least a portion of the metal surface 321E. A reflectance of the outer circumferential surface of the cylindrical portion 212E is lower than a reflectance of the metal surface 321E.

The upper flat plate portion 213E has a mounting plate hole portion 214E arranged to pass through the upper flat plate portion 213E in the axial direction. As indicated by an arrow, light from a light source passes through the mounting plate hole portion 214E and is emitted axially upward. Accordingly, the light from the light source is not reflected off a surface of the motor 1E axially below the mounting plate hole portion 214E. The cylindrical portion 212E covers at least a portion of the metal surface 321E axially above the mounting plate hole portion 214E. This reduces diffused reflection of the light emitted from the light source and then reflected off the metal surface 321E. Note that a rotor hub 35E is desirably made of a material such as a resin having a reflectance lower than the reflectance of the metal surface 321E.

Figure 8:
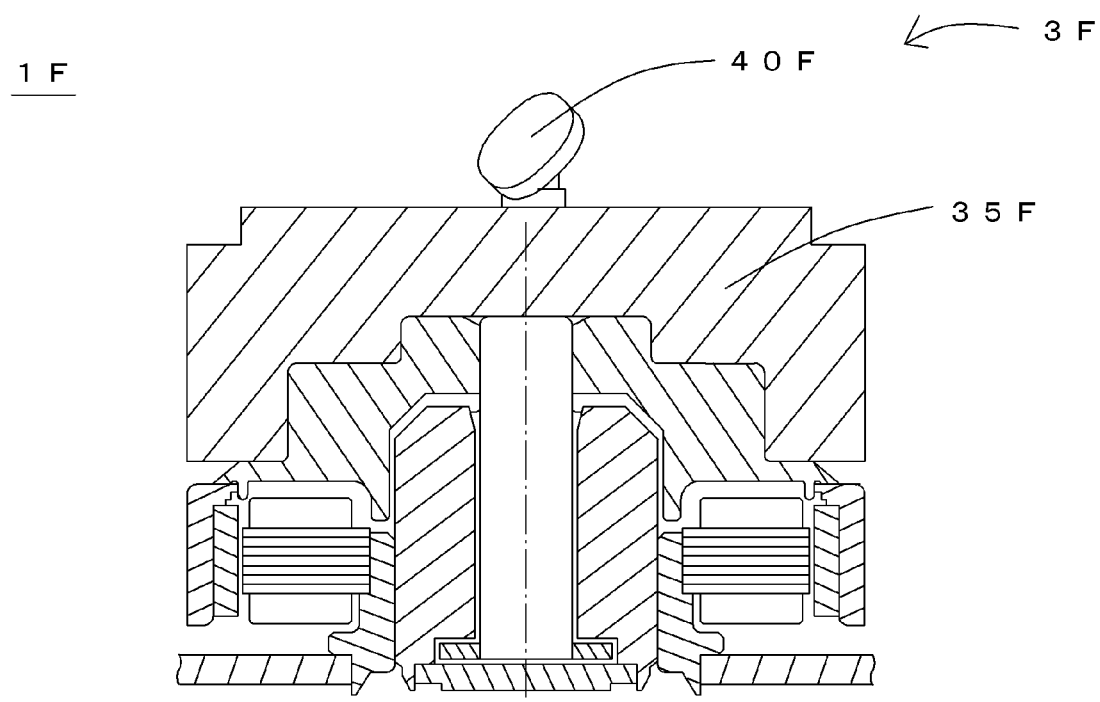
FIG. 8 is a vertical cross-sectional view of a motor according to another example modification of the present invention.

FIG. 8 is a vertical cross-sectional view of a motor 1F according to another example modification of the present invention. In the example illustrated in FIG. 8, a rotating portion 3F includes a mirror 40F. The mirror 40F is supported by a flywheel 35F. Once the motor 1F is driven, the mirror 40F is caused to rotate together with the flywheel 35F. Accordingly, the motor 1F allows light incident on the mirror 40F to be reflected while deflecting the light with a fixed cycle.

Note that details of the structure and the shape of a motor according to a preferred embodiment of the present invention may differ from details of the structure and the shape of each motor as illustrated in the accompanying drawings of the present application.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a rotating portion arranged to rotate about a central axis directed in a vertical direction;
   a stationary portion; and
   a bearing arranged to support the rotating portion such that the rotating portion is rotatable with respect to the stationary portion,
   wherein
   the rotating portion includes:
   a shaft arranged to extend along the central axis;
   a magnet;

a rotor hub arranged to extend in an annular shape around the shaft; and
a flywheel fixed to the rotor hub,
at least a portion of an outward surface of the rotor hub is a metal surface,
the metal surface is arranged radially inward of an outer circumferential surface of the flywheel,
a reflectance of the outer circumferential surface of the flywheel is lower than a reflectance of the metal surface,
the flywheel includes:
 a flywheel main body; and
 an inertia portion made of a metal and arranged to extend downward from a lower end of the flywheel main body, and
a reflectance of an of circumferential surface of the inertia portion is lower than the reflectance of the metal surface.

2. The motor according to claim 1, wherein
the outer circumferential surface of the flywheel is subjected to oxidation plating.

3. The motor according to claim 1, wherein
the flywheel includes a wall portion arranged to cover at least a portion of an outward portion of the metal surface.

4. The motor according to claim 1, wherein
an outer circumferential surface of the flywheel is subjected to surface roughing.

5. The motor according to claim 1, wherein
the metal surface is an inclined surface at an angle with respect to the central axis.

6. A motor comprising
a rotating portion arranged to rotate about a central axis directed in a vertical direction;
a stationary portion; and
a bearing arranged to support the rotating portion such that the rotating portion is rotatable with respect to the stationary portion,
wherein
the rotating portion includes:
 a shaft arranged to extend along the central axis;
 a magnet;
 a rotor hub arranged to extend in an annular shape around the shaft; and
 a flywheel fixed to the rotor hub,
at least a portion of an outward surface of the rotor huh is a metal surface,
the metal surface is arranged radially inward of an outer circumferential surface of the flywheel,
a reflectance of the outer circumferential surface of the flywheel is lower than a reflectance of the metal surface,
the rotating portion further includes a yoke to which the magnet is fixed,
an outer circumferential surface of the metal surface is arranged radially inward of an outer circumferential surface of the yoke, and
a reflectance of the outer circumferential surface of the yoke is lower than the reflectance of the metal surface.

7. The motor according to claim 6, wherein
the yoke includes a yoke cylindrical portion arranged to cover at least a portion of the metal surface and an entire outer circumferential surface of the magnet.

8. The motor according to claim 6, wherein
the yoke includes a ring-shaped yoke upper plate portion arranged to extend radially inward from an upper end of the yoke cylindrical portion, and
the yoke upper plate portion is arranged on an upper surface of the rotor hub.

9. The motor according to claim 6, wherein
the yoke is subjected to plating using a black coloring material.

10. The motor according to claim 6, wherein
the outer circumferential surface of the flywheel is subjected to oxidation plating.

11. The motor according to claim 6, wherein
the outer circumferential surface of the flywheel is subjected to surface roughing.

12. The motor according to claim 6, wherein
the metal surface is an inclined surface at an angle with respect to the central axis.

13. The motor according to claim 6, wherein
the flywheel includes a wall portion arranged to cover at least a portion of an outward portion of the metal surface.

* * * * *